Patented Aug. 6, 1929.

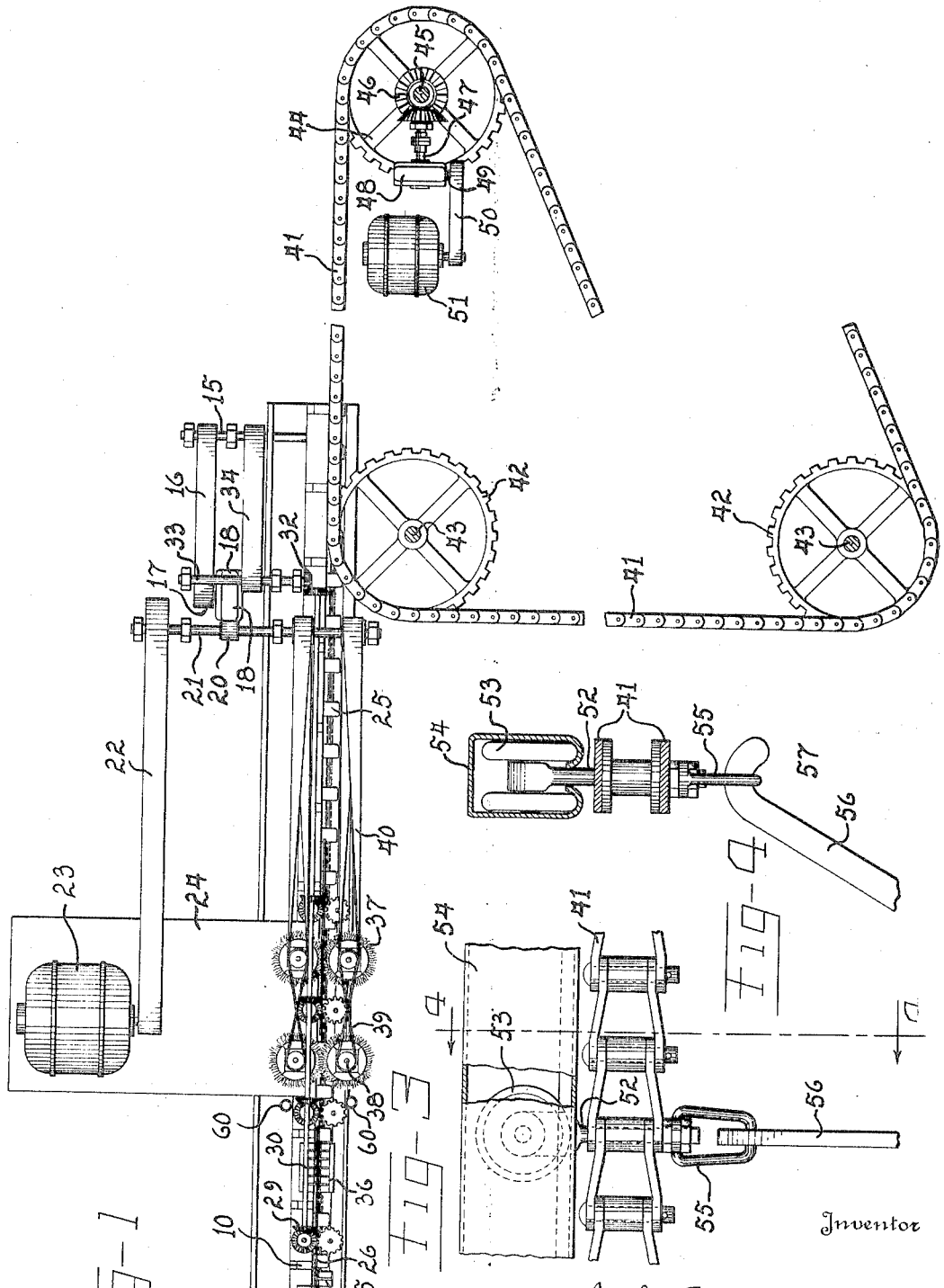

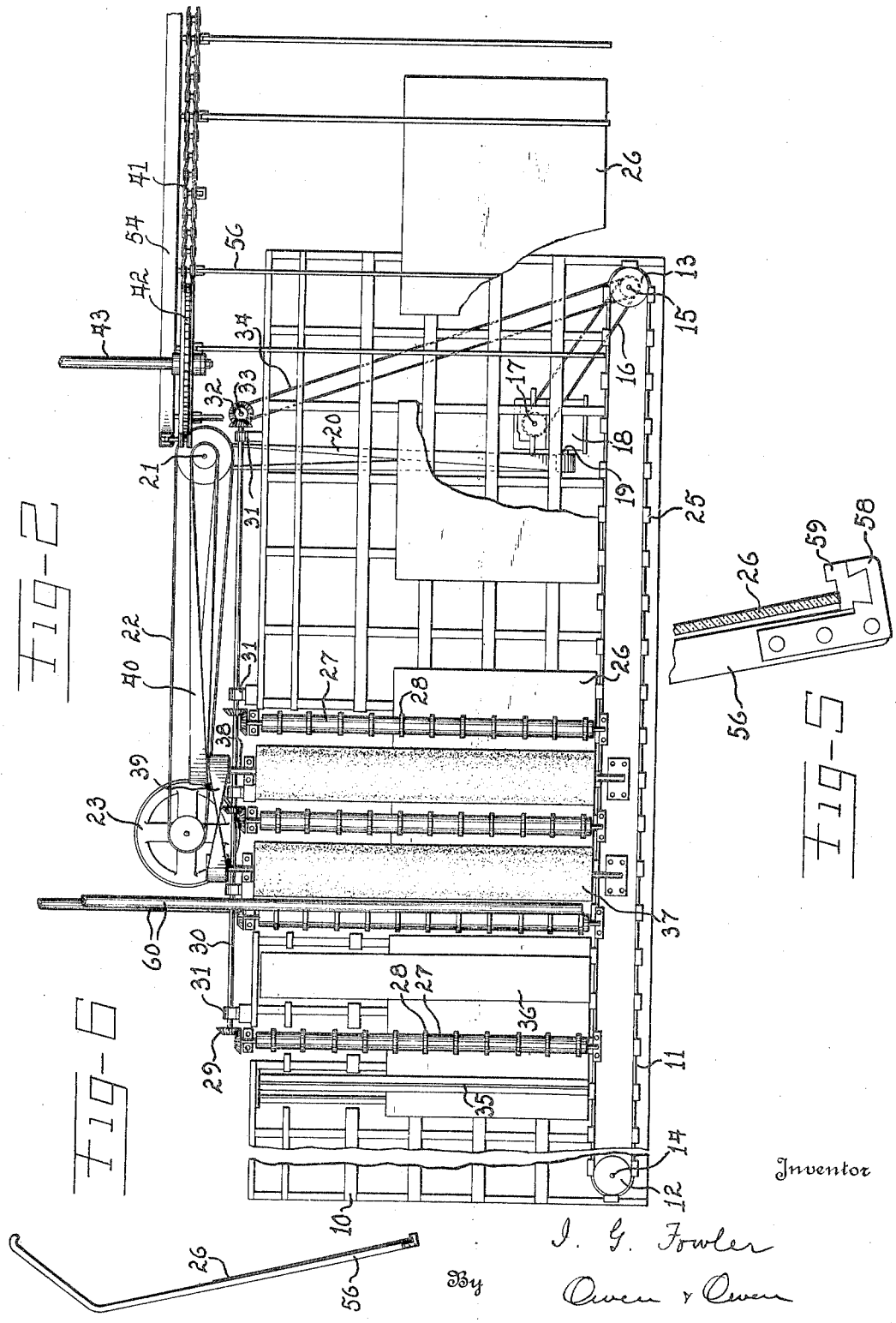

1,723,148

UNITED STATES PATENT OFFICE.

IVAL G. FOWLER, OF TOLEDO, OHIO, ASSIGNOR TO THE EDWARD FORD PLATE GLASS COMPANY, OF ROSSFORD, OHIO, A CORPORATION OF OHIO.

MEANS FOR HANDLING PLATE GLASS.

Application filed July 20, 1927. Serial No. 207,158.

This invention relates to means for handling plate glass during its manufacture, with particular reference to the cleaning or scrubbing of the plates and the subsequent examination, grading and cutting thereof.

In the manufacture of plate glass, the cleaning, examining and cutting of the plates has heretofore been accomplished as separate operations, and the transfer of the plates from one operation to the other, especially in the smaller sizes, has been for the most part done manually. The object of the present invention is to provide means for facilitating the handling of the plates, so that these operations may be practically continuous and may be carried out expeditiously, with little manual labor.

In the present adaptation of the invention to the manufacture of plate glass, a machine is provided for scrubbing and drying the plates as they are carried therethrough in an approximately vertical position, both sides of the plate being treated simultaneously. As the plates leave this machine they are received by a suitable conveying device and carried to the cutting table, during which travel they are examined and marked for defects, quality and the like. As the plates reach the cutting table, they are removed from the conveying device and are fed beneath the cutters, which will be adjusted to cut the plates in accordance with the marking thereon.

The detailed construction of the invention, together with its objects and advantages, will be more particularly explained in connection with the accompanying drawings, which illustrate one embodiment thereof.

In the drawings:

Figure 1 is a plan view of the cleaning mechanism with which is associated the device for receiving and conveying the plates to the cutting table.

Fig. 2 is a side elevation of the same with parts broken away.

Fig. 3 is an enlarged detail view of a portion of the conveying device.

Fig. 4 is a section taken on the line 4—4 of Fig. 3.

Fig. 5 is a detail view of the lower end of one of the hangers, a portion of the plate being shown in section.

Fig. 6 is a detail view of one of the hangers detached.

The mechanism for scrubbing and drying the plates is carried by a frame work 10 having an approximately vertical face, at the base of which is an endless carrier 11. This carrier travels over suitable wheels 12 and 13 which are mounted on shafts 14 and 15 respectively, suitably mounted in the lower part of the frame 10. One of the wheels, as 13, is driven by a belt 16 from a shaft 17 which is driven through a gear box 18 by a shaft 19. The shaft 19 is driven by a belt 20 or the like from a shaft 21 mounted above the frame 10 and the shaft 21 is driven by a belt 22 from a motor 23 mounted upon a platform 24.

The carrier 11 is provided with a series of blocks 25 of wood or other soft material upon which the glass 26 is supported as it is carried through the machine, the glasses being disposed in approximately a vertical plane with its edge resting on the blocks.

The glass 26 is fed forwardly between pairs of rollers 27 which are provided with soft rubber facing strips 28 for gripping the opposite faces of the glass without injuring the same. The rollers 27 are driven by beveled gearing 29 from a longitudinal shaft 30 which is mounted in bearings 31 at the top of the frame. The shaft 30 is driven by beveled gearing 32 from a shaft 33 which is driven from the shaft 15 by a belt 34 so that the glass engaging strips 28 move at substantially the same rate of speed as the carrier 11.

Before being engaged by the first pair of rollers 27, the glass passes between a pair of wipers 35, each consisting of a holding member to which is secured a strip of rubber with its edge adapted to bear against the surface of the plate. Between the first and second pair of rollers 27 there is located a pair of felt wipers 36 adapted to wipe the opposite surfaces of the glass.

After passing between the felt wipers 36, the glass passes between pairs of rotary cylindrical brushes 37 which rotate with a much greater surface speed than the rate of travel of the plates, the result being that the surface of the glass is thoroughly brushed and cleaned during its passage between the brushes.

Both the rubber and felt wipers are used in order to remove the surplus moisture, particles of plaster and other foreign matter and the like from the surface of the glass before it passes through the brushes. Water is sprayed over the plates prior to their passage through the scrubbing machine. After the plates have passed the felt wipers 36, they may be further dried by spraying with air through pipes 60, before entering between the brushes 37. The rollers 37 are carried on shafts 38 which are connected on each side of the machine by crossed belts 39 so that the two brushes on the same side of the glass are driven in opposite directions. One shaft 38 at each side of the machine is directly driven from the shaft 21 by a belt 40.

As each plate of glass 26 leaves the scrubber, it is automatically delivered to a conveying device which conveys it to the cutting table and while so doing holds it in a position where it may be conveniently inspected and marked for defects, quality and the like, preparatory to cutting. This conveying device comprises a sprocket chain 41 which passes over idler sprockets 42 mounted on shafts 43 and over a drive sprocket 44 secured to a shaft 45. The shaft 45 is driven by beveled gearing 46 from a shaft 47, the latter being driven through a gear box 48 from a shaft 49 which is driven through a belt 50 from a motor 51.

The sprocket chain 41 is supported at short intervals by a series of spindles 52, each spindle being supported at its upper end by a double trolley wheel 53 guided in a track 54. Each spindle has a swivel 55 mounted on its lower end and a carrier member or hanger 56 may be suspended from the swivel 55, each hanger being formed with a hook 57 at its upper end so that it may be readily hung upon the swivel or removed therefrom at the option of the operator. Each hanger 56 has an angular bracket or hook 58 secured to its lower end which is provided with a shoe 59 of wood, lead, or other comparatively soft material which will not injure the edges of the plates.

Each hanger 56 extends from the swivel 55 downwardly and inwardly, as shown in Figs. 4 and 6, while its lower portion extends downwardly and outwardly, as shown in Figs. 5 and 6, forming an obtuse angle with the upper portion. Thus, the plates 26, as they are carried by the hangers, are inclined slightly from a perpendicular position so that they rest in position against the shanks of the hangers but may be easily removed therefrom when they reach the cutting table. The hangers 56, when supported by the chain 41, are so arranged that as the chain travels at the same speed as the carrier 11, the hooks 58 swing underneath the plate 26 between the respective blocks 25 and receive and support the plate as it leaves the carrier 11.

The plates which pass through the scrubbing machine may be of different sizes, and of course may be spaced at different distances from each other. An operator, therefore, arranges the hangers upon the lap of the chain 41 which is approaching the carrier 11, so that there will be two hangers, and only two, in proper position to engage and support each plate as it is delivered from the guide rollers 27.

As the plate 26 passes slowly along on the hangers 56 it has been thoroughly cleaned and dried and may be carefully inspected for discovering any defects therein. During this travel the glass is marked by the inspector and as the plate approaches the vicinity of the wheel 44 it is removed from the carrier and placed upon the cutting table which is conveniently located alongside the carrier. After being cut as indicated by the inspection marks it may be returned to the carrier, the hangers being properly arranged to receive the same. As the glass is carried along the next lap of the carrier it is sorted and packed according to its size and quality. Thus the operations of cleaning, examining, marking, cutting, sorting and packing the glass are carried out successively and constitute in fact one continuous process and no time or labor is expended needlessly.

While I have shown and described in considerable detail the present construction of the invention, it is, of course, to be understood that this is merely for the purpose of illustration and that various modifications may be made in the arrangement of the various parts without any material departure from the essential features of the invention as claimed.

What I claim is:

1. The combination with means for feeding a glass plate longitudinally and for delivering it from the feeding means, of a traveling conveyor provided with means for supporting said plate in a substantially vertical position while it is being conveyed thereby, the orbit of said conveyor being such as to bring said supporting means into co-operative relation to the feeding means so as to receive the plate by gravity as it is delivered by said feeding means and to convey it therefrom.

2. The combination with means for feeding a glass plate longitudinally and for delivering it from the feeding means, of a conveyor comprising an endless element, and carriers depending from said endless element, said endless element being so positioned in relation to the feeding means as to swing the carriers beneath the plate to receive the same by gravity and to support it as it is delivered by said feeding means.

3. The combination with means for guiding and conveying a glass plate in an approximately vertical plane, of a traveling carrier and means co-ordinated with said first mentioned means to swing the carrier into position to receive the plate automatically as it is released from said guide means, and to convey it to the place where it is to be cut, while retaining it in upright position with both faces uncovered so that they may be examined.

4. The combination with means for guiding and conveying a glass plate in an approximately vertical plane, of a conveyor comprising an endless element, carriers depending from said endless element, and means for actuating said endless element and carriers in synchronism with said guiding means, said endless element being so positioned as to swing the carriers into position to receive the plate by gravity from said guiding means and to retain it in upright position, so that it may be examined as it is being conveyed away from said guiding means.

5. In a glass handling device, the combination of conveying and guiding means for moving the glass while maintaining it in approximately vertical position, said conveying means including spaced blocks upon which the lower edge of the glass rests, a plurality of hangers, an endless carrier having equi-distant means to receive and support the respective hangers, and means associated with said carrier for moving said hangers into spaces between said blocks for receiving and supporting the glass as it is delivered from said conveying means.

6. In a glass handling device, the combination of conveying and guiding means for moving the glass while maintaining it in approximately vertical position, said conveying means including spaced blocks upon which the lower edge of the glass rests, a plurality of hangers having hooks at their upper ends and shoes at their lower ends on which the lower edge of the glass may rest, an endless carrier having spaced means to which the hooks of the respective hangers may be removably attached, and means for actuating said carrier to move the hangers into spaces between said blocks for receiving and supporting the glass as it is delivered from said conveying means.

7. In a conveying device, the combination of a plurality of hangers having hooks at their upper ends, and a traveling carrier having spaced means to which the hooks of the respective hangers may be removably attached, each hanger having a laterally extending shoe at its lower end, against which the lower edge of the glass may rest, and having a shank against which the glass may lean in nearly vertical position, so that it may be inspected while traveling on said carrier.

8. In a glass conveying device, the combination of a traveling carrier and a plurality of hangers suspended therefrom, each hanger comprising a comparatively long straight shank portion with a shoe at its lower end against which the lower edge of a glass plate may rest, said shank portion being offset at its upper end from the point of suspension, whereby gravity causes said shank portion and the glass plate adjacent the same to assume a slightly inclined position regardless of the weight of the glass.

9. In a glass conveying device, the combination of a traveling carrier, a plurality of equi-distant swivel members associated therewith, and a plurality of hangers adapted to carry glass plates and selectively attachable to any of said swivel members, whereby they may be suitably spaced in accordance with the length of the plate to be carried.

10. In a glass conveying device, the combination of a traveling carrier, a plurality of equi-distant swivel members associated therewith, and a plurality of hangers adapted to carry glass plates and selectively attachable to any of said swivel members, each hanger comprising a comparatively long straight shank portion with a shoe at its lower end against which the lower edge of the glass plate may rest, said shank portion being offset at its upper end from the point of suspension, whereby gravity causes said shank portion and the glass plate adjacent the same to assume a slightly inclined position regardless of the weight of the glass.

11. In a device for carrying glass plates, the combination of a traveling carrier, a plurality of hangers having hooks at their upper ends, and a plurality of means arranged at different points along the length of the carrier for selectively attaching said hooks to support the hangers in suspended relation to the carrier at proper distances apart to adapt them to the length of the plate to be carried, each hanger having a shoe at its lower end for engagement by the lower edge of the plate.

12. In a glass conveying device, the combination of a traveling carrier, a plurality of hangers suspended therefrom, each hanger comprising a shoe on which the lower edge of the glass may rest and an inclined shank portion upon which the glass may lean, the space on the side of the glass opposite said shank portion being entirely unobstructed to permit the free loading or unloading of the glass.

13. In a glass conveying device, the combination of a traveling carrier, a plurality of equi-distant swivel members associated therewith, and a plurality of hangers adapted to carry glass plates and selectively attachable to any of said swivel members, whereby they may be suitably spaced in accordance with the length of the plate to be carried, each hanger comprising a shoe on which the lower edge of the glass may rest and an inclined shank portion upon which the glass may lean, the space on the side of the glass opposite said shank portion being entirely unobstructed to permit the free loading or unloading of the glass.

14. A hanger comprising a shank with a hook at its upper end by which it may be suspended and an outwardly extending shoe at its lower end against which the lower edge of a glass plate may rest, the main portion of said shank being offset from the hook, so that when suspended thereby gravity causes it to slope upwardly and inwardly and the plate may lean against the shank and be held there by gravity.

15. A hanger comprising a shank with a hook at its upper end by which it may be suspended and an outwardly extending bracket at its lower end with a soft shoe covering the same and providing a surface against which the lower edge of a glass plate may rest, the main portion of said shank being offset from the hook and forming an tuse angle with the portion which connects it to the hook, so that when suspended by the hook gravity causes it to assume such a position that the main portion slopes upwardly and inwardly.

In testimony whereof I have hereunto signed my name to this specification.

IVAL G. FOWLER.